(12) United States Patent
Zukowski et al.

(10) Patent No.: US 7,113,130 B2
(45) Date of Patent: Sep. 26, 2006

(54) METHOD AND SYSTEM FOR DETERMINING LOCATION BY IMPLICATION

(75) Inventors: Deborra J. Zukowski, Newtown, CT (US); James R. Norris, Jr., Danbury, CT (US); John W. Rojas, Norwalk, CT (US)

(73) Assignee: Pitney Bowes Inc., Stamford, CT (US)

( * ) Notice: Subject to any disclaimer, the term of this patent is extended or adjusted under 35 U.S.C. 154(b) by 111 days.

(21) Appl. No.: 10/710,294

(22) Filed: Jun. 30, 2004

(65) Prior Publication Data

US 2005/0273291 A1 Dec. 8, 2005

Related U.S. Application Data

(60) Provisional application No. 60/521,613, filed on Jun. 6, 2004, provisional application No. 60/521,747, filed on Jun. 29, 2004.

(51) Int. Cl.
- *G01S 13/06* (2006.01)
- *G01S 3/04* (2006.01)
- *G01S 13/74* (2006.01)

(52) U.S. Cl. .......................... 342/451; 342/27; 342/59; 342/118; 342/175; 342/195; 342/450; 342/463; 342/464; 342/465

(58) Field of Classification Search .......... 367/87–116; 342/27, 28, 59, 82–103, 165–175, 190–197, 342/29–51, 118, 450–465, 357.01–357.17, 342/13, 129, 162; 340/945
See application file for complete search history.

(56) References Cited

U.S. PATENT DOCUMENTS 3,765,017 A * 10/1973 Dentino .................... 342/162
5,045,860 A * 9/1991 Hodson .................... 342/451
5,128,684 A * 7/1992 Brown ..................... 342/195
5,382,957 A * 1/1995 Blume ...................... 342/43
5,500,647 A * 3/1996 Carrara .................... 342/195
5,504,489 A * 4/1996 Kronhamn ................ 342/118
5,774,089 A * 6/1998 Bamler et al. ............ 342/195
5,963,163 A * 10/1999 Kemkemian et al. ...... 342/129
6,023,238 A * 2/2000 Cornic et al. ............. 342/129
6,064,333 A * 5/2000 Stromberg ................. 342/95
6,278,401 B1* 8/2001 Wigren ..................... 342/195
6,282,526 B1* 8/2001 Ganesh ..................... 342/13
6,411,900 B1* 6/2002 Flick ........................ 342/455
6,437,726 B1* 8/2002 Price ........................ 342/195

(Continued)

*Primary Examiner*—Bernarr E. Gregory
(74) *Attorney, Agent, or Firm*—George M. Macdonald; Steven J. Shapiro; Angelo N. Chaclea

(57) ABSTRACT

Systems and methods for determining location by implication are described. A responsive environment includes a location determination method that operates in an area that is only partially instrumented with location-sensing devices. Some of the with location-sensing devices sense location ambiguously. For example, a location-sensing device may be deployed at a boundary between two target objects or areas of interest. The location of the target object, as reported by such devices, is considered ambiguous. While the object or person is known to be in a space, it is not clear which specific space. The location of ambiguously located objects can be disambiguated based on changes in the location of other objects. For example, if a document is placed on a shelf in an office, such action strongly implies that someone is in the office. Therefore, if a person is known to potentially be in the office or the outside hallway, the person's location is changed to be in the office.

18 Claims, 4 Drawing Sheets

U.S. PATENT DOCUMENTS 6,492,938 B1 * 12/2002 Alland ........................ 342/118
6,580,387 B1 * 6/2003 Kronhamn .................. 342/118
6,963,291 B1 * 11/2005 Holforty et al. ............ 340/945
2002/0113729 A1 * 8/2002 Kronhamn .................. 342/118

* cited by examiner

METHOD AND SYSTEM FOR DETERMINING LOCATION BY IMPLICATION

CROSS REFERENCE TO RELATED APPLICATIONS

Application Ser. No. 60/521,613, filed Jun. 6, 2004, entitled Responsive Environment Sensor Systems With Delayed Activation, which is incorporated herein by reference in its entirety. This application claims priority under 35 U.S.C. section 119(e) from Provisional Patent Application Ser. No. 60/521,747, filed Jun. 29, 2004, entitled Responsive Environment, which is incorporated herein by reference in its entirety.

BACKGROUND OF INVENTION

The illustrative embodiments described in the present application are useful in systems including those for use in context aware environments and more particularly are useful in systems including those for determining location in a context aware environment.

The term responsive environment may be used to describe an environment that has computing capability and access to sensing technology data that allows the environment control to consider its current state or context and new events that occur that may change the state or context.

Context-aware environments typically utilize location information as an important type of context. Global Positioning System (GPS) devices are available that provide relatively reliable position determination functionality while outdoors. However, GPS signals are typically too weak to be effective indoors. Accordingly, the determination of indoor position is more problematic.

Over the last few years, several approaches to solve the indoor position determination problem have been attempted. Each of these traditional approaches places a certain amount of burden on the user. For example, in some systems, the user needs to proceed to a location at which the user presence can be sensed. In other systems, the user must wear a special device that interacts with the environment to indicate location.

In traditional indoor positioning systems, the location context is determined by one of a few known methods. In the simplest method, an indoor positioning system utilizes a field-of-view approach. With this method, objects have a means of identity and a means of communicating this identity when entering the field of view of the location-sensing apparatus. One of three traditional categories of systems may be utilized with this simple method. In one type of system, infrared location cones may be utilized. In those systems, the objects announce their identity using infrared signals. In a second type of system, video identification techniques may be used. In those systems, faces or unique markings are identified and associated with the viewed locations. In a third type of system, electro-magnetic field perturbations may be used. In those systems, objects carry tags that emit identification signals when present within the field. There, sensed objects are known to be within the location covered by the view of the sensing apparatus.

A second and slightly more complex method for determining location is based on radio frequency technology. In this method, objects carry an RF transmitter that can announce the identity of the object. The RF signal is detected at multiple RF receivers and the location is determined based on signal strengths across these receivers.

A third system for determining locations is based on ultrasonic signaling. In this method, objects carry a signaling device, often called a beacon. Signal detectors are placed throughout a room, and the location of the object is determined by triangulation among the detectors that receive the signal from the beaconing device. All of these indoor position determination methods are described in a paper entitled "Location of Mobile Devices Using Networked Surfaces," by Hoffman and Scott, as presented at the 4rth International Conference on Ubiquitous Computing (UbiComp2002).

A fourth system integrating portions of the systems described above is described in a paper entitled "Location Estimation Indoors by Means of Small Computing Power Devices, Accelerometers, Magnetic Sensors, and Map Knowledge" by Vildjiounaite et. al., as presented at the First International Conference on Pervasive Computing in August of 2002. In that system, the user wears sensors that measure variables such as direction and speed. The sensors broadcast that information via RF signaling. A host computer receives the information and uses it to determine the location of the wearer. The location can be adjusted using traditional field-of-view approaches.

The first two methods described above have several deficiencies. For example, the object must be within a field such as an electromagnetic or visual/audio field. This is problematic for several reasons. First, humans prefer not to be subjected to a local, relatively high-power continuous RF field. Second, such fields need to be omnipresent with complete area coverage for these systems to work well. Third, if the fields are omni-present, people may perceive privacy concerns. While the third method described above does not suffer the same disadvantages of the first two methods, it does require that objects wear a device that is currently bulky and expensive.

Accordingly, among other things, the prior art does not provide a context-aware environment that can adequately determine position information.

SUMMARY OF INVENTION

The illustrative embodiments described herein overcome the disadvantages of the prior art by providing a method and system for determining location by implication.

In one illustrative embodiment, a responsive environment includes a location determination method that operates in an area that is only partially instrumented with location-sensing devices. Some of the location-sensing devices sense location ambiguously. For example, a location-sensing device may be deployed at a boundary between two areas of interest. The location of the target object, as reported by such devices, is considered ambiguous. While the object or person is known to be in a space, it is not clear which specific space. The location of ambiguously located objects can be disambiguated based on changes in the location of other objects. For example, if a document is placed on a shelf in an office, such action strongly implies that someone is in the office. Therefore, if a person is known to potentially be in the office or the outside hallway, the person's location is changed to be in the office.

DETAILED DESCRIPTION

Figure 1:
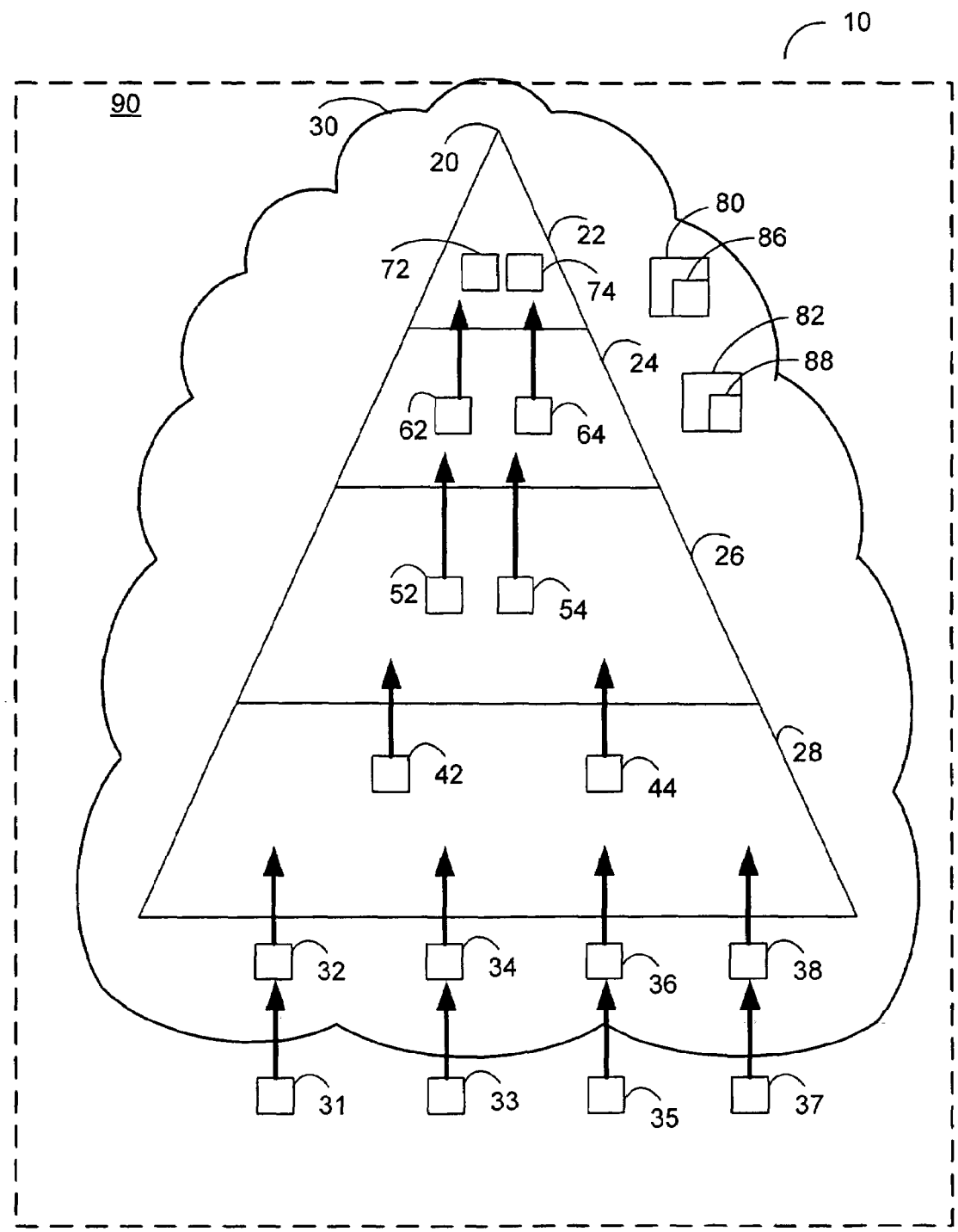
FIG. 1 is a schematic representation of a representative responsive environment according to an illustrative embodiment of the present application.

Illustrative embodiments describing systems and methods for responsive environments for determining location by implication are described. The illustrative embodiments are described with reference to particular representative configurations, sensors and data types, but systems according to the present application may use varied and variable configurations, sensor types and data and functionality types.

Several disadvantages of traditional indoor positioning systems have been described. The illustrative embodiments of the present application provide several advantages over prior systems. The embodiments describe responsive environments that enable the use of RFID sensors in determining location, without requiring the presence of the object within the field. Such systems are advantageous due to health concerns and cost concerns, as fewer RFID readers are needed to determine location.

The illustrative embodiments of the present application expand upon a traditional field-of-view position determination system. The embodiments described allow objects, including people, to be sensed using field-of-view techniques. Traditional field-of-view systems assign a field to a particular location. For example, if a person is sensed in a field, then it is determined that the person is in the corresponding location. Conversely, if a person is not sensed in that field, then it is determined that the person is not in that corresponding location. However, in the embodiments described herein, fields can also be assigned to the boundaries of locations. The specific location of a person can be determined based on sensing of other objects in fields within one of the spaces sharing the boundary.

For example, an RFID interrogator can be placed at the door of an office. As tagged objects pass though the field, their location is known to be either the office of the hallway. Accordingly, the actual location of the tagged object is ambiguous. The office contains additional RFID interrogators placed in various locations such as on desks, shelves and in bins. As a person uses these spaces that are quipped with RFID interrogators, such as by placing a tagged document on the desk, the location of the person is updated to show that the person is actually in the office. The previous location ambiguity is removed by utilizing the implication that since something is happening in the office, the person must be in the office. As can be appreciated, the person did not directly get sensed in the office.

If two or more people are potentially in the office and the use of other objects within the office cannot fully disambiguate among them, the system may take one or more of several actions. First, the system can leave the location as equally ambiguous. Second, the system can update the location of all people to be more likely in the office. Third, the system can update the location of one or some of the people based on previous knowledge about the object. For example, the system may know who last used the document that was sensed in the office. However, as more information is gathered from activities within the office, then more certainty using standard artificial intelligence techniques such as Bayesian networks can be gained and applied to imply location of an object or person. Such notions depart from the typical use of such devices that were previously described in which an object is known to be at a location only if it is within the range (view) of the device.

Referring to FIG. 1, an illustrative responsive environment 10 according to an illustrative embodiment of the present application is shown. The representative responsive environment has been implemented in a system known as Atira that includes a context management infrastructure that includes a layered framework of incremental intelligence in the form of a PAUR pyramid 20 that has four layers each including components that have similar overall roles. The components pass messages up to the layer above. However, different components in a particular layer may provide specialized functionality by subscribing to a subset of messages from the layer below.

External stimuli are sensed using physical or logical sensors 31, 33, 35 and 37. The stimuli enter the pyramid 2 through sensor/trigger components 32, 34, 36, 38 that interact directly with the sensors. Those triggers typically only publish into the pyramid rather than subscribe to messages. The lowest layer of the pyramid is the P or Perception layer 28 and it includes several perception components 42, 44. The perception components may subscribe to stimuli events. Similarly, the perception components may publish to the next higher level. The Perceptors are used to filter the types of external stimuli that are used to build the context.

The next level of the pyramid 20 is the A—Awareness layer 26. The awareness layer components 52, 54 are known as Monitors. The monitors manage the state of active entities that are known in the context such as document, application or task entities. The monitors 52, 54 manage the overall state of the environment by updating properties associated with entities. They determine the occurrence of activities such as a person carrying a particular document that may also indicate an additional change in state. They also manage the relationships among the entities.

The next level of the pyramid 20 is the U—Understanding layer 24. The understanding layer components 62, 64 are known as Grokkers. The grokkers determine the types of activities that are underway in the environment. The grokkers determine if changes in the context merit a change in behavior in the room, and if so, determines the type of behavior and initiates it. Grokkers are also utilized to prime applications.

The final level of the pyramid 20 is the R—Response layer 22. The response layer components 72, 74 are known as Responders. The responders semantically drive the environment function and prepare and deliver an announcement that describes the needed behavior. The applications in the environment use the announcements to decide if any function is needed.

The responsive environment 10 includes thin client applications that reside outside of the context infrastructure 30. For example, an interface browser application 80 may be used to view objects in the environment. Additionally, an application launcher client 82 may be used to launch external applications based upon the context contained in the PAUR pyramid 20. A Notification Manager can be a thin client application with an interactive component that manages the user's attention. For example, the thin clients 80, 82 include actuators 86 and 88 that are part of the thin client systems. The actuators and thin clients may subscribe to announcements of the system and can also include triggers to create internal stimuli such as an application-entered environment.

The illustrative responsive environment system described utilizes a central server computing system comprising one or more DELL® servers having an INTEL® PENTIUM® processor running the WINDOWS® XP operating system. The system is programmed using the JBOSS system and the Java Messaging System (JMS) provides the publish/subscribe messaging system used in the responsive environment.

In an illustrative embodiment, physical sensor 31 is a scanner system that also includes a computer that interfaces with the sensor component 32 using a serial line or TCP/IP interface. The connections among the physical systems that comprise the logical system 90 include wireless and wired connections among physical computers running the appropriate applications, components and frameworks. Sensors 35, 37 are RFID sensors each including a computer that interfaces with the respective sensor components using a serial line. Sensor 33 may comprise well-known sensors such as thermometers, pressure sensors, odor sensors, noise sensors, motion sensors, light sensors, passive infrared sensors and other well-known sensors. Additional well-known communications channels may also be used. In the illustrative embodiment described, the JBOSS JMS message space is running on one server while the MySQL system is run using another server to maintain tables used in the RDF system for model databases. Additionally, the PAUR components such as component 42 are all running on a third server. The thin clients 80, 82 and thin client components 86, 88 are running on separate client machines in communication with the system 90.

The responsive environment described herein is illustrative and other systems may also be used. For example, a querying infrastructure could be used in place of the notification or publish/subscribe system that is described above. Similarly, the messaging service could be provided across systems and even across diverse system architectures using appropriate translators. While INTEL® processor based systems are described using MICROSOFT® WINDOWS systems, other processors and operating systems such as those available from Sun Microsystems may be utilized.

Figure 2:
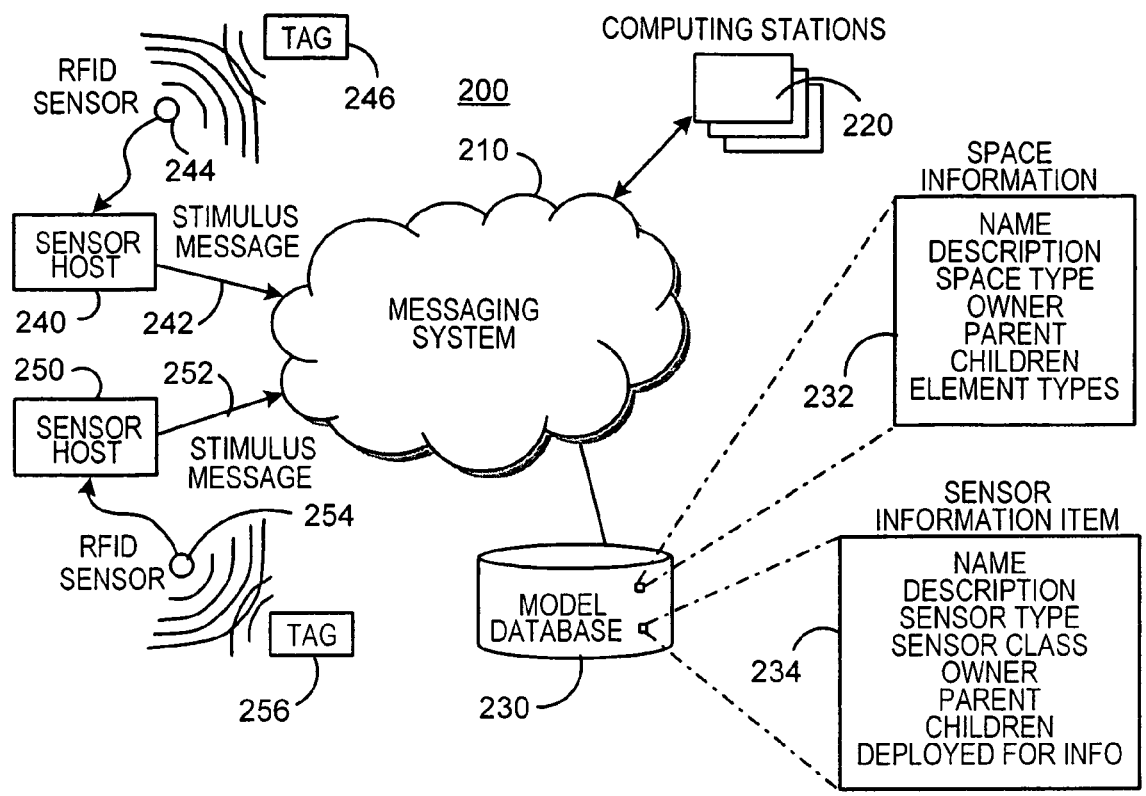
FIG. 2 is a schematic representation of an illustrative responsive environment and messaging system for determining location by implication according to an illustrative embodiment of the present application.

Referring to FIG. 2, an illustrative responsive environment 200 and messaging system 210 for determining location by implication according to an illustrative embodiment of the present application is shown.

Responsive environments 200 typically include means for managing the state of the environment, means for sensing events that may change that state and means for driving responses to the change in state. In the representative embodiment shown, sensing devices include RFID sensors 244, 254. The sensor devices are supported by respective host computer systems 240, 250 for communicating stimulus messages along respective communication channels 242, 252.

The sensors 244, 254 are capable of sensing any object that has an RFID tag affixed to it such as representative tags 246, 256. As can be appreciated, other types of sensors that can identify objects could be used as well. Each deployed sensor 244, 254 is registered within the responsive environment 200. In this representative example, the registration information is stored within a model database 230.

Sensor information 234 includes the name and description of the sensor, and a list of spaces over which the field of view of the sensor extends as noted in the "DeployedForInfo" property. The spaces noted in this property are also registered in the model. Space information items 232 include name and description data for the space, and a list of valid types that can be present within the space as noted in the "ElementTypes" property. For example, all object types can be present within an office space, but in a representative embodiment, only documents and devices can be present within a cabinet drawer.

When a sensor 244, 254 detects a tag 246, 256, the sensor creates a message with information declared on the tag, and posts the message to the message space 210. One or more software components within the responsive environment that are running on the computing stations 220 of the environment can receive these messages.

Figure 3:
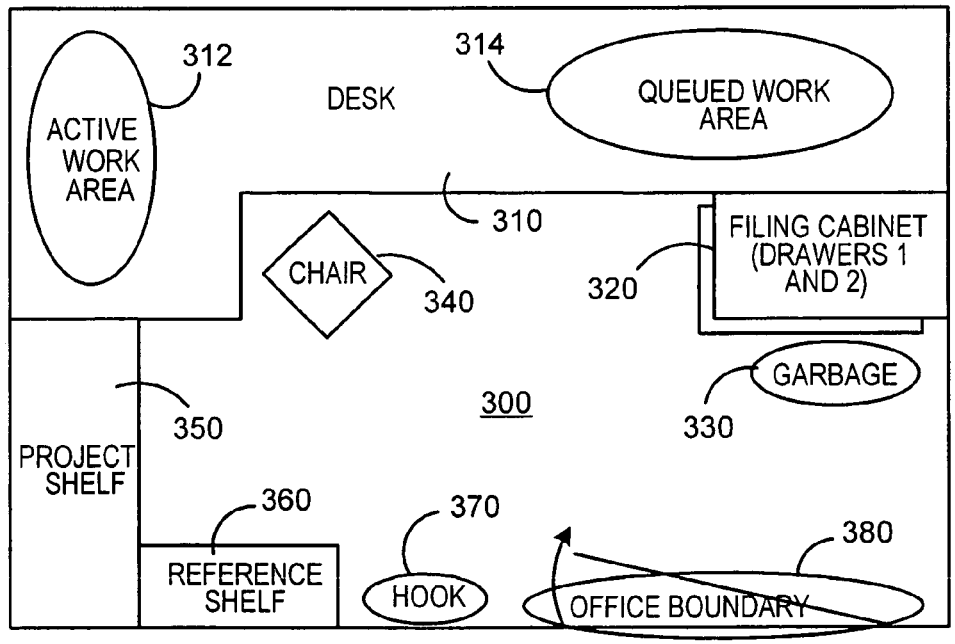
FIG. 3 is a schematic representation of an illustrative responsive environment for determining location by implication according to an illustrative embodiment of the present application.

Referring to FIG. 3, an illustrative responsive environment 300 for determining location by implication according to an illustrative embodiment of the present application is shown.

In the office 300, there are 8 RFID sensors deployed, as shown by the shaded areas 312, 314, 320, 330, 380, 370, 360, and 350. Since the other areas of the room 300 do not have sensors, it can be appreciated that most of the office area is devoid of electromagnetic fields relating to the sensors. For example, the chair 340 does not include a sensor. Similarly, the desk 310 has only two areas that are covered by sensors, namely the active work area 312 and the queued work area 314. All of the sensors in the office 300, except the Office Boundary sensor 380 are deployed for a single space. The Office Boundary sensor 380 is deployed for the office and the external hallway.

The filing cabinet 320 has a sensor, as does the garbage can 330. The coat hook 370 has a sensor as does the project shelf 350 and the reference shelf 360. Each of the sensors can provide information or context that may be useful in resolving location ambiguity for an object in the office 300.

Figure 4:
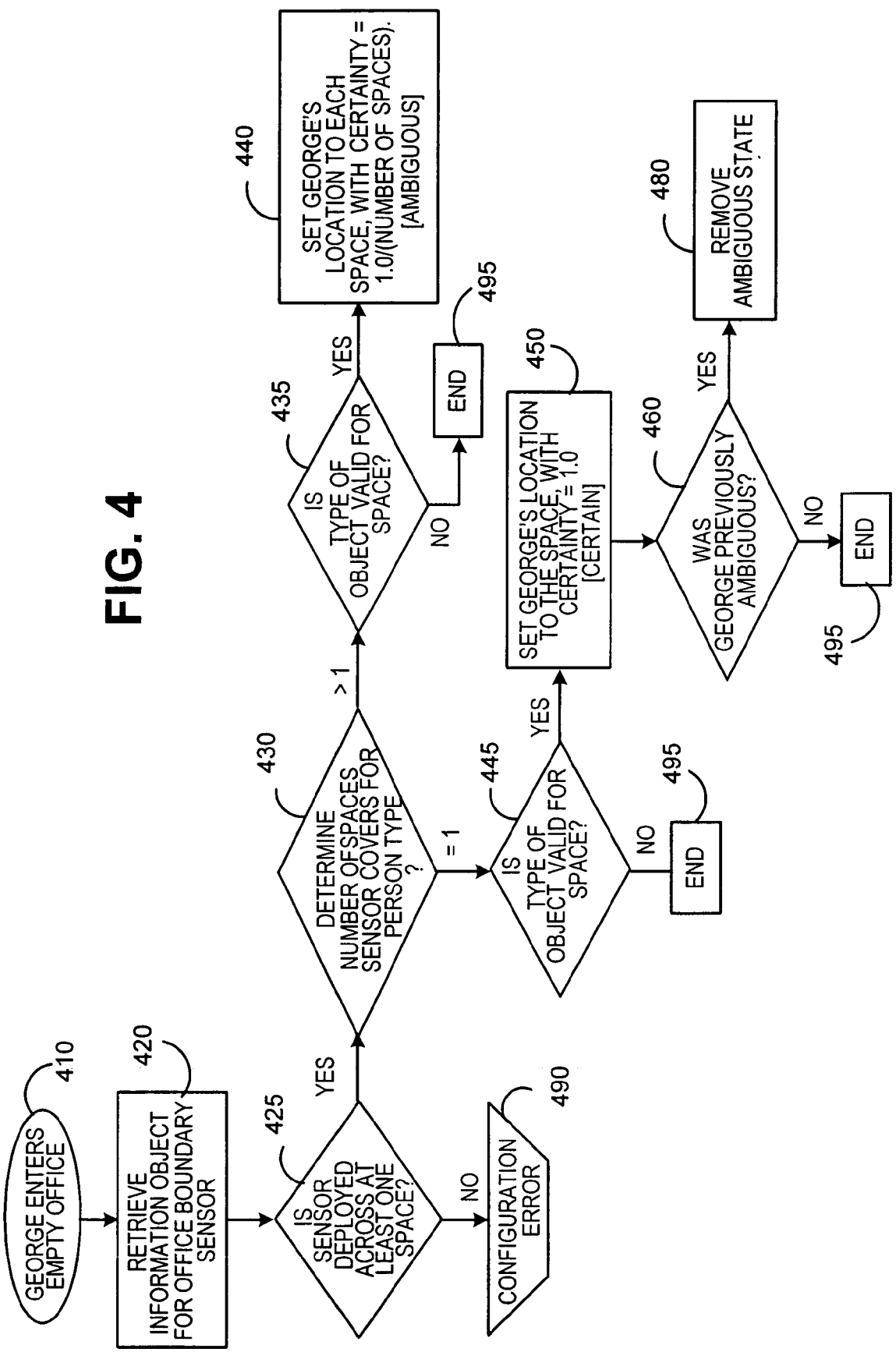
FIG. 4 is a flowchart showing a representative method for determining location according to an illustrative embodiment of the present application.
Figure 5:
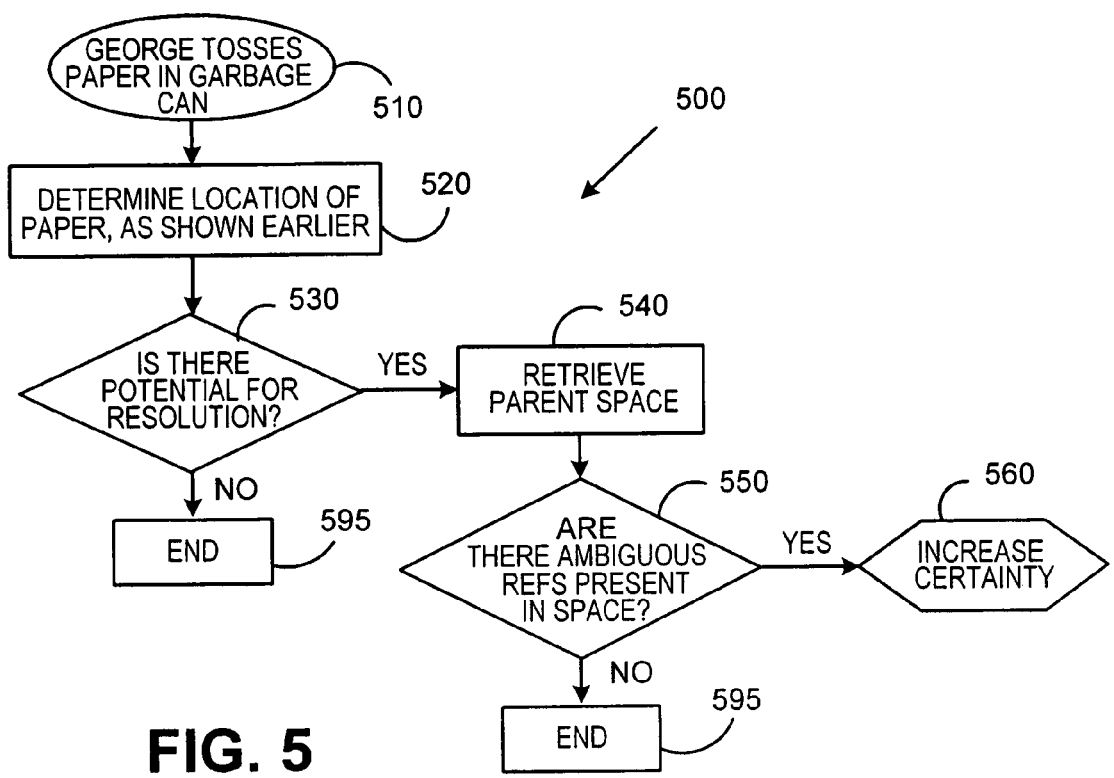
FIG. 5 is a flowchart showing a representative method for determining location resolution according to an illustrative embodiment of the present application.
Figure 6:
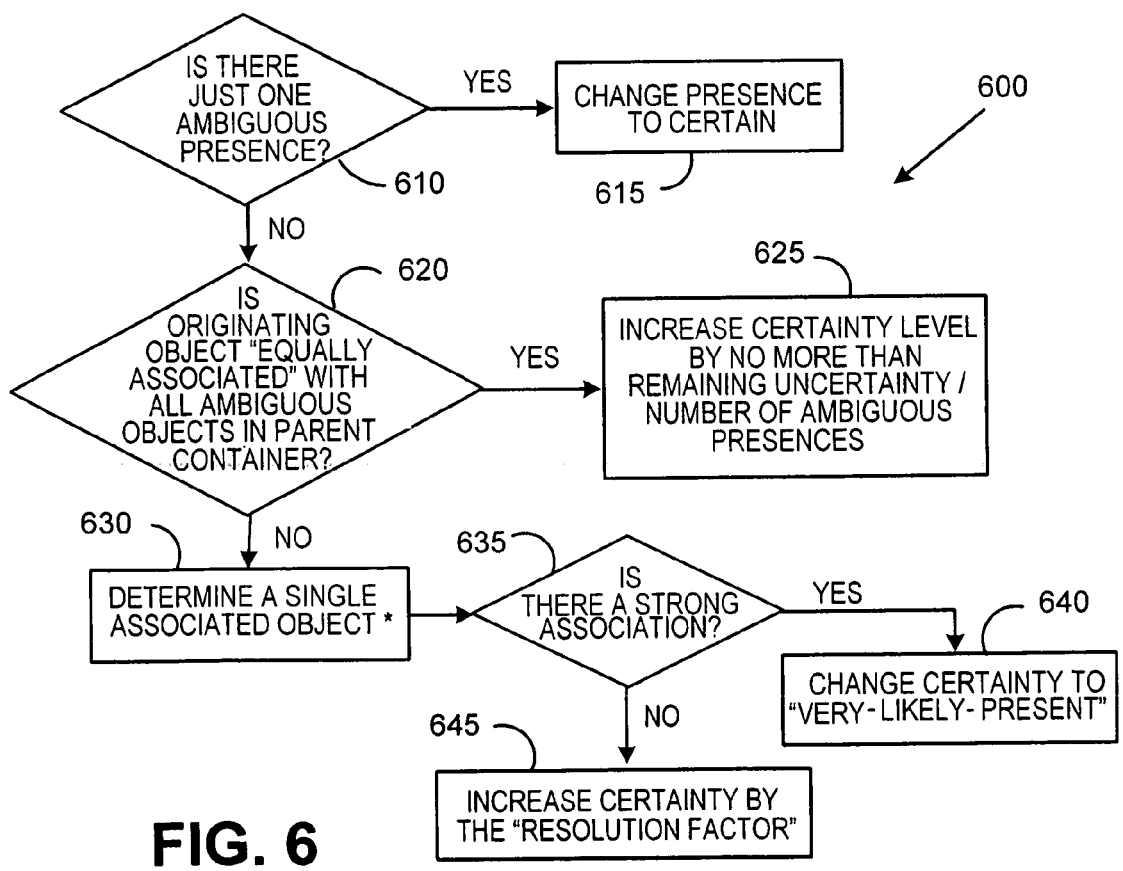
FIG. 6 is a flowchart showing a representative method for determining location certainty according to an illustrative embodiment of the present application.

Referring to FIGS. 4–6, various stages of a representative process to determine location by implication are shown. In the illustrative method described, when a sensor that spans multiple spaces senses an object, the presence of that object is ambiguously noted for each of the covered spaces. The presence of the object can be resolved based on later activity with one of those spaces, even if the object itself is not further detected.

Referring to FIG. 4, a representative method 400 for determining location according to an illustrative embodiment of the present application is shown.

In step 410, a representative person, George, walks through the Office Boundary. In step 420, the Office Boundary sensor information, as registered in the model, is retrieved. In step 425, the system checks to ensure that the sensor is deployed across at least one defined space. If not, the system reports a configuration error in step 490. If the sensor is deployed and associated with at least one defined space, the process proceeds to step 430 to determine the number of spaces that the sensor covers for that person type.

If the number of spaces covered is exactly 1, the process proceeds down the less interesting path of location certainty toward step 445. In step 445, the process checks that the type of object sensed is valid for the space associated with the sensor. If it is not, the process ends in step 495.

If in step 445 the process determines that the object is a valid type, it proceeds to step 450 to set the persons location to the associated space with certainty. The process then proceeds to step 460 to check for the need for resolution. If George's location was ambiguous, then the ambiguous information is removed in step 480. Otherwise, the process ends in step 495.

Returning to step 430, if the process determines that the sensor covers more than one space, the process proceeds to step 435 to determine whether the object is a valid type for the space. If so, the process proceeds to step 440 to set the ambiguous location of person George in each of the spaces covered by the sensor with a proportional certainty of 1 divided by the number of spaces.

Since the representative sensor 380 of this example is deployed at a boundary, its field of view extends across two spaces, as noted in the "DeployedForInfo" property. Therefore, since the number of spaces covered by the sensor is greater than 1, George is listed as potentially in both the office and the external hallway. Accordingly, George's presence is ambiguous and the certainty of presence in each of the two spaces is initially set for each at 50 percent.

Referring to FIG. 5, a representative method for determining location resolution 500 according to an illustrative embodiment of the present application is shown. For illustrative purposes, the example described above is continued here. If George walks to the garbage can 330 and throws out a tagged document, the system may be able to imply certain information. Since the sensor 330 is deployed for just one space, namely the garbage can, the document is unambiguously known to be in the garbage can. As a result, knowledge of this event can be used to resolve ambiguous presence in parent containers such as the room. Accordingly, the parent container data is retrieved and checked for any ambiguous presences.

In step 510, a sensor senses that a piece of paper was tossed in the garbage can. In step 520, the location of the paper is determined as described above with reference to FIG. 4. In step 530, the process determines whether there is a potential for resolving any ambiguous location data. If so, the process proceeds to step 540 to retrieve the parent space information. For example, here, the office location data would be retrieved. The process proceeds to determine whether there are any objects listed as present ambiguously in the parent space of the office. If there are objects listed with ambiguous presence in the office such as George at 50%, the process proceeds to step 560 to increase certainty. An illustrative process for increasing certainty is shown below with reference to FIG. 6.

Referring to FIG. 6, a representative method 600 for determining location certainty according to an illustrative embodiment of the present application is shown. For illustrative purposes, the example described above is continued here. If ambiguous location references are found as in the example, then the event of throwing a document away can be used to increase certainty in one or more of these ambiguous presences. If only one person might be in the parent container or office, then most certainly, that user was the one to throw the document away. Accordingly, we are certain that the user is in the parent container or office.

If more than one person is potentially in the space, then more processing is required. For example, the object of the triggering event, in this case the document, may be associated with a particular person. If the document was a private document that was known to be possessed only by a single person, then it is very likely, though not absolutely necessary that it was that person who threw it away. Therefore the presence of that person is changed to Very-Likely present. As can be appreciated, certainty in such an example is not assured. If the paper was being passed around a lot, and several of the people had previously possessed it, then the last possessor is likely the one to throw it away, but this is far from certain. Therefore the certainty of that person is increased some, based on the tuning of the system. For example, if 4 people handled the document, the system might decide to increase the certainty for the relevant person by only 25 percent closer to certainty.

If the document was public and none of the people were known to have previously possessed it, then either the certainty of each is increased a bit or the system can leave the certainty as is currently set. If the certainty is increased, tuning parameters can be set to maximize the amount of certainty that can result. For example, a limit is placed on the system such that certainty based on non-associated objects can go up to 70 percent and no further.

In step 610, the system determines if only one object is present ambiguously in the room. If so, the process proceeds to step 615 and sets the presence of that object in the office to 100 percent certainty.

Otherwise, in step 620, the process determines whether the originating object (the piece of trash) was equally associated with all of the ambiguous objects in the parent container or office. If so, the system proceeds to step 625 to increase the certainty level by no more than the remaining uncertainty divided by the number of ambiguous objects present in the parent container.

Otherwise, the process proceeds to step 630 to iterate through each of the ambiguous objects in the office. In step 635, the process determines whether there is a strong association between the piece of trash and one of the people that might be in the office. If so, it proceeds to step 640 to change the ambiguous location data field for that person to very likely present. If not, the process proceeds to step 645 to increase the certainty of location for that particular person by the resolution factor described above.

For the purpose of clarity, an example describing a single association has been illustrated. However, one of skill in the art will be able to practice the invention as described by relaxing the assumption that there is a single association. If the assumption were relaxed, the impact on the resulting derived system would be to the calculation of the increase of certainty and how it is shared among those associated. It would not changes the steps described for the simplified case.

The illustrative embodiments described herein provide a method to determine location, as defined by presence in a space that departs from traditional approaches. In at least one embodiment, the system utilizes a space that can be sparsely instrumented with very inexpensive technology. It uses the notion of concurrent activity to help resolve location ambiguities that may arise from the limitations of such instrumentation.

Co-pending, commonly owned U.S. patent application Ser. No. 10/710,293 filed on even date herewith, is entitled Responsive Environment Sensor Systems With Delayed Activation and is incorporated herein by reference in its entirety.

Co-pending, commonly owned U.S. patent application Ser. No. 10/710,295, filed on even date herewith, is entitled Method and System For Deployment of Sensors and is incorporated herein by reference in its entirety.

The present application describes illustrative embodiments of a system and method for determining location by implication. The embodiments are illustrative and not intended to present an exhaustive list of possible configurations. Where alternative elements are described, they are understood to fully describe alternative embodiments without repeating common elements whether or not expressly stated to so relate. Similarly, alternatives described for elements used in more than one embodiment are understood to describe alternative embodiments for each of the described embodiments having that element.

The described embodiments are illustrative and the above description may indicate to those skilled in the art additional ways in which the principles of this invention may be used without departing from the spirit of the invention. Accordingly, the scope of each of the claims is not to be limited by the particular embodiments described.

The invention claimed is:

1. A method for determining whether an ambiguous location value of a first object can be further resolved comprising:

sensing a second object presence in a field of a sensor;

determining whether the location of the second object is known unambiguously, if the location of the second object is known unambiguously, determining whether the second object is associated with the first object; and further resolving the ambiguous location of the first object using the location of the second object.

2. The method of claim 1, further comprising, determining whether the second object is uniquely associated with the first object.

3. The method of claim 2, further comprising, if the second object is uniquely associated with the first object, unambiguously resolving the location of the first object by using the location of the second object.

4. The method of claim 3, wherein, the second object is located in a child location of a parent location, further comprising, if the second object is uniquely associated with the first object, unambiguously resolving the location of the first object to be the parent location.

5. The method of claim 2, further comprising, if the second object is not uniquely associated with the first object, determining an increase in location probability for the first object and further resolving location of the first object by using the location of the second object and the increase in location probability.

6. The method of claim 5, wherein, an artificial intelligence system is used to determine the increase in location probability for the first object.

7. The method of claim 6, wherein, the artificial intelligence system is a baysian network.

8. The method of claim 1, further comprising, determining whether the second object is strongly associated with the first object.

9. The method of claim 8, further comprising, if the second object is strongly associated with the first object, ambiguously resolving the location of the first object to a very likely probability by using the location of the second object.

10. A method for determining whether an ambiguous location value of a first object can be further resolved comprising:

sensing a second object presence in a field of a sensor;

determining whether the location of the second object is known ambiguously, if the location of the second object is known ambiguously, determining whether the second object is associated with the first object;

determining whether the ambiguous location of the second object provides information to further resolve the location of the first object; and if the ambiguous location of the second object provides information to further resolve the location of the first object, further resolving the ambiguous location of the first object using the location of the second object.

11. The method of claim 10, further comprising, determining whether the second object is uniquely associated with the first object.

12. The method of claim 11, further comprising, if the second object is uniquely associated with the first object, further resolving the location of the first object by using the location of the second object.

13. The method of claim 12, wherein, the second object is ambiguously located in one of a plurality of child locations of a parent location, further comprising, if the second object is uniquely associated with the first object, unambiguously resolving the location of the first object to be the parent location.

14. The method of claim 11, further comprising, if the second object is not uniquely associated with the first object, determining an increase in location probability for the first object and further resolving location of the first object by using the location of the second object and the increase in location probability.

15. The method of claim 14, wherein, an artificial intelligence system is used to determine the increase in location probability for the first object.

16. The method of claim 15, wherein, the artificial intelligence system is a baysian network.

17. The method of claim 10, further comprising, determining whether the second object is strongly associated with the first object.

18. The method of claim 17, further comprising, if the second object Is strongly associated with the first object, ambiguously resolving the location of the first object by using the ambiguous location of the second object and the strength of the association.

* * * * *